United States Patent
Mushnuri et al.

(10) Patent No.: US 12,518,041 B2
(45) Date of Patent: Jan. 6, 2026

(54) CONFIGURABLE SECURITY POLICY ARCHITECTURE

(71) Applicant: ServiceNow, Inc., Santa Clara, CA (US)

(72) Inventors: Kiran Mushnuri, Hyderabad (IN); Varun Kumar Jayanti, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 173 days.

(21) Appl. No.: 18/452,145

(22) Filed: Aug. 18, 2023

(65) Prior Publication Data

US 2025/0061219 A1    Feb. 20, 2025

(51) Int. Cl.
G06F 21/62    (2013.01)
G06F 21/42    (2013.01)
G06F 21/00    (2013.01)

(52) U.S. Cl.
CPC .............................. G06F 21/6218 (2013.01)

(58) Field of Classification Search
None
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |

(Continued)

FOREIGN PATENT DOCUMENTS

| | | |
|---|---|---|
| EP | 0433979 A2 | 6/1991 |
| EP | 1607824 A2 | 12/2005 |

(Continued)

*Primary Examiner* — Venkat Perungavoor
(74) *Attorney, Agent, or Firm* — McDonnell Boehnen Hulbert & Berghoff LLP

(57) ABSTRACT

A method includes obtaining a request for data, and obtaining a security policy indicator that indicates a security policy. The security policy may include access conditions that define data access according to one or more attribute values of an attribute. The method also includes determining an attribute value of the attribute based on the request, and identifying a subset of the data based on the attribute value. The subset of the data may satisfy the security policy. The method further includes providing the subset of the data to a software application.

20 Claims, 9 Drawing Sheets

(56) References Cited

U.S. PATENT DOCUMENTS

| | | |
|---|---|---|
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 7,975,286 B1 * | 7/2011 | Fickey .................... H04L 63/20 726/4 |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 10,154,065 B1 * | 12/2018 | Buchler .............. G06F 21/6218 |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,023,615 B2 | 6/2021 | Larson |
| 11,025,481 B1 | 6/2021 | Louca |
| 11,089,115 B2 | 8/2021 | Garty |
| 11,095,506 B1 | 8/2021 | Erblat |
| 11,190,550 B1 * | 11/2021 | Wu ......................... H04L 63/20 |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,513,910 B2 | 11/2022 | Natanzon |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2005/0114672 A1 * | 5/2005 | Duncan ................... G06F 21/10 713/182 |
| 2006/0026453 A1 | 2/2006 | Frost |
| 2006/0095461 A1 | 5/2006 | Raymond |
| 2006/0179058 A1 | 8/2006 | Bram |
| 2006/0293922 A1 | 12/2006 | Chaddha |
| 2007/0033279 A1 | 2/2007 | Battat |
| 2007/0136603 A1 * | 6/2007 | Kuecuekyan ....... H04L 63/0884 713/185 |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0189793 A1 * | 8/2008 | Kirkup .................... G06F 21/53 726/27 |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2014/0189777 A1 * | 7/2014 | Viswanathan ........ H04L 63/105 726/1 |
| 2015/0074763 A1 * | 3/2015 | Schwartz .............. H04W 4/029 726/4 |
| 2017/0272472 A1 * | 9/2017 | Adhar ................... G06F 21/602 |
| 2018/0075554 A1 | 3/2018 | Clark |
| 2018/0123940 A1 | 5/2018 | Rimar |
| 2019/0073257 A1 | 3/2019 | Dasgupta |
| 2019/0104398 A1 | 4/2019 | Owen |
| 2019/0220607 A1 * | 7/2019 | Dodor ..................... G06F 16/27 |
| 2020/0050689 A1 | 2/2020 | Tal |
| 2020/0204443 A1 | 6/2020 | Bar Oz |
| 2020/0301678 A1 | 9/2020 | Burman |
| 2021/0136117 A1 * | 5/2021 | Kuppannan ............. H04L 63/20 |
| 2021/0194764 A1 | 6/2021 | Badyan |
| 2022/0029886 A1 | 1/2022 | Hameiri |
| 2023/0086068 A1 * | 3/2023 | Zaitsev ................... H04L 67/10 726/3 |
| 2024/0015165 A1 * | 1/2024 | Guy ..................... H04L 41/0893 |
| 2024/0348662 A1 * | 10/2024 | Wakudkar ............. H04L 63/20 |
| 2025/0085996 A1 * | 3/2025 | Suman ................. G06F 21/602 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

CONFIGURABLE SECURITY POLICY ARCHITECTURE

BACKGROUND

A security policy may define conditions under which data is accessible and/or inaccessible to a software application. Developing and/or maintaining application-specific implementations of a security policy may be difficult, inefficient, and/or insecure, especially as the number of software applications adhering to the security policy increases and/or the security policies change over time. Specifically, developing and/or maintaining multiple application-specific implementations of the security policy may involve significant expenditures of software development resources, and may result in the security policy implementations of some applications being underdeveloped, erroneous, and/or outdated, resulting in security vulnerabilities.

SUMMARY

A computing system may include a security controller that implements one or more security policies on behalf of one or more software applications. Specifically, the security controller may provide a plurality of security policies, each of which may be implemented using corresponding security policy code that is executable by the security controller on behalf of the software applications. For each respective software application of the one or more software applications, the security controller may allow one or more of these security policies to be selected for and assigned to the respective software application. Thus, the security controller may allow different software applications to adhere to different security policies. The security controller may mediate communications between the respective software applications and a data source in accordance with the security policies assigned thereto, thus preventing the respective software application from violating the security policies assigned thereto.

Each respective security policy of the plurality of security policies may define conditions under which data protected by the respective security policy is accessible and/or inaccessible to a software application. Specifically, the corresponding security policy code of the respective security policy may condition access to the data protected thereby on attribute values of attributes associated with requests for the data. The attributes may provide information about a user requesting the data, a computing device used to request the data, the software application used to request that data, and/or the data itself, among others. Thus, each security policy may limit data access to particular users, devices, applications, geographic locations, and/or other contexts/conditions.

The security controller may be configured to receive, from the respective software application, a request for data and, based thereon, determine one or more attribute values of attributes on which data access is conditioned by the security policies selected for the respective software application. The security controller may satisfy the request by obtaining and providing, to the software application, at least a subset of the requested data that the security policy permits based on the one or more attribute values. Thus, by executing the security policy code assigned to the respective software application, the security controller may operate as a filter that allows the respective software application to access permitted data, and prevents the respective software application from accessing blocked data.

The security controller may allow multiple different software applications to adhere to various security policies without depending on application-specific implementations of these security policies. Thus, once a security policy is developed and deployed to the security controller, the security policy may be reused across multiple software applications. Additionally, as the security policy is updated over time to improve the data protection capabilities thereof, the update may be automatically utilized by each of the multiple software applications without any application-specific changes and/or modifications. Further, since the security policy code is executed by the security controller, and not by individual software applications, the software applications may be unable to voluntarily and/or accidentally violate the security policy.

Accordingly, a first example embodiment may involve obtaining a request for data. The first example embodiment may also involve obtaining a security policy indicator that indicates a security policy. The security policy may include access conditions that define data access according to one or more attribute values of an attribute. The first example embodiment may additionally involve determining an attribute value of the attribute based on the request. The first example embodiment may further involve identifying a subset of the data based on the attribute value. The subset of the data may satisfy the security policy. The first example embodiment may yet further involve providing the subset of the data to a software application.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
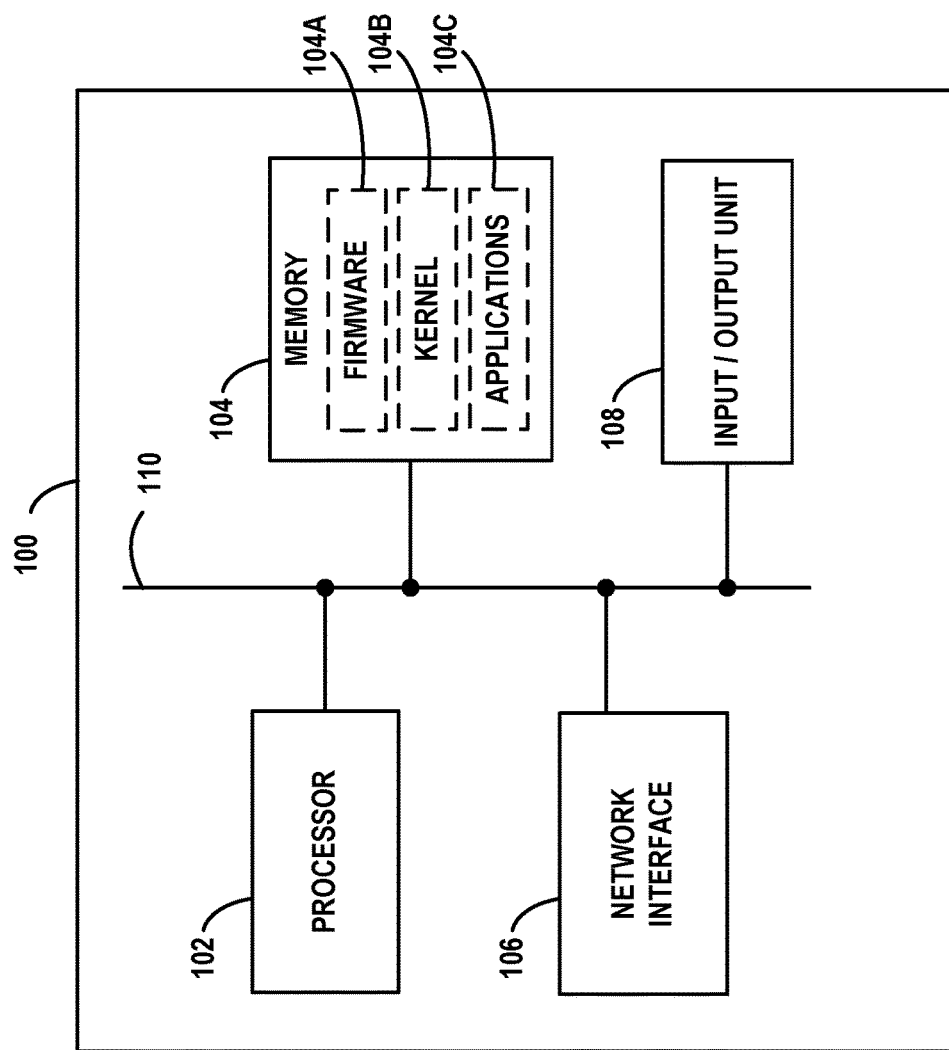
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
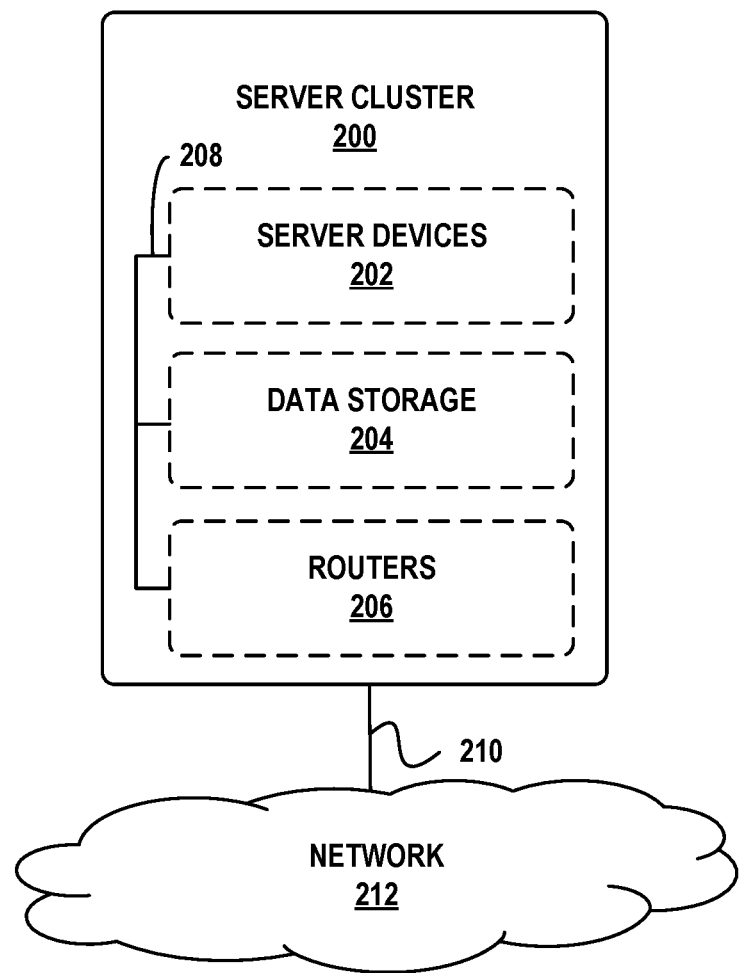
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
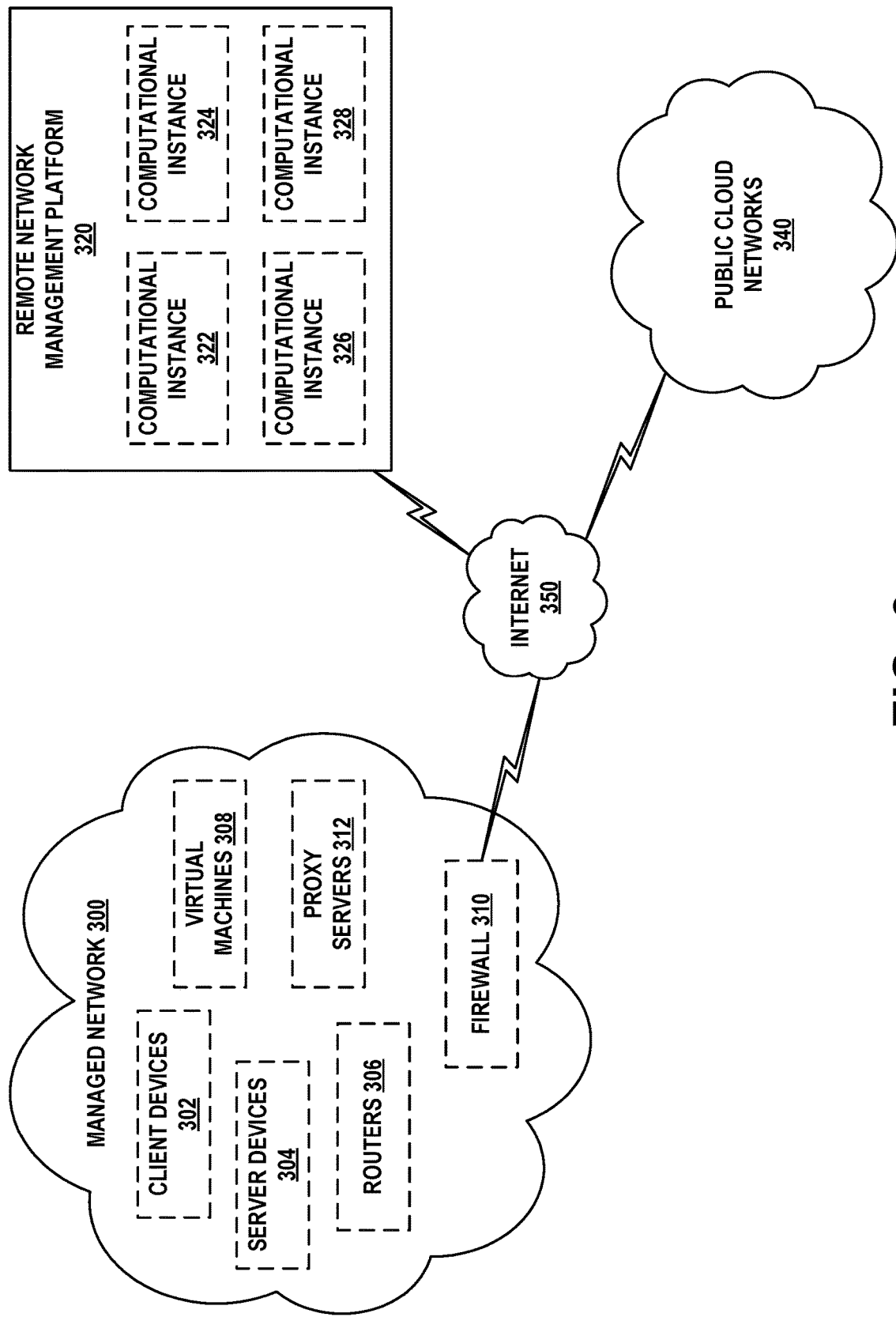
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are commingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
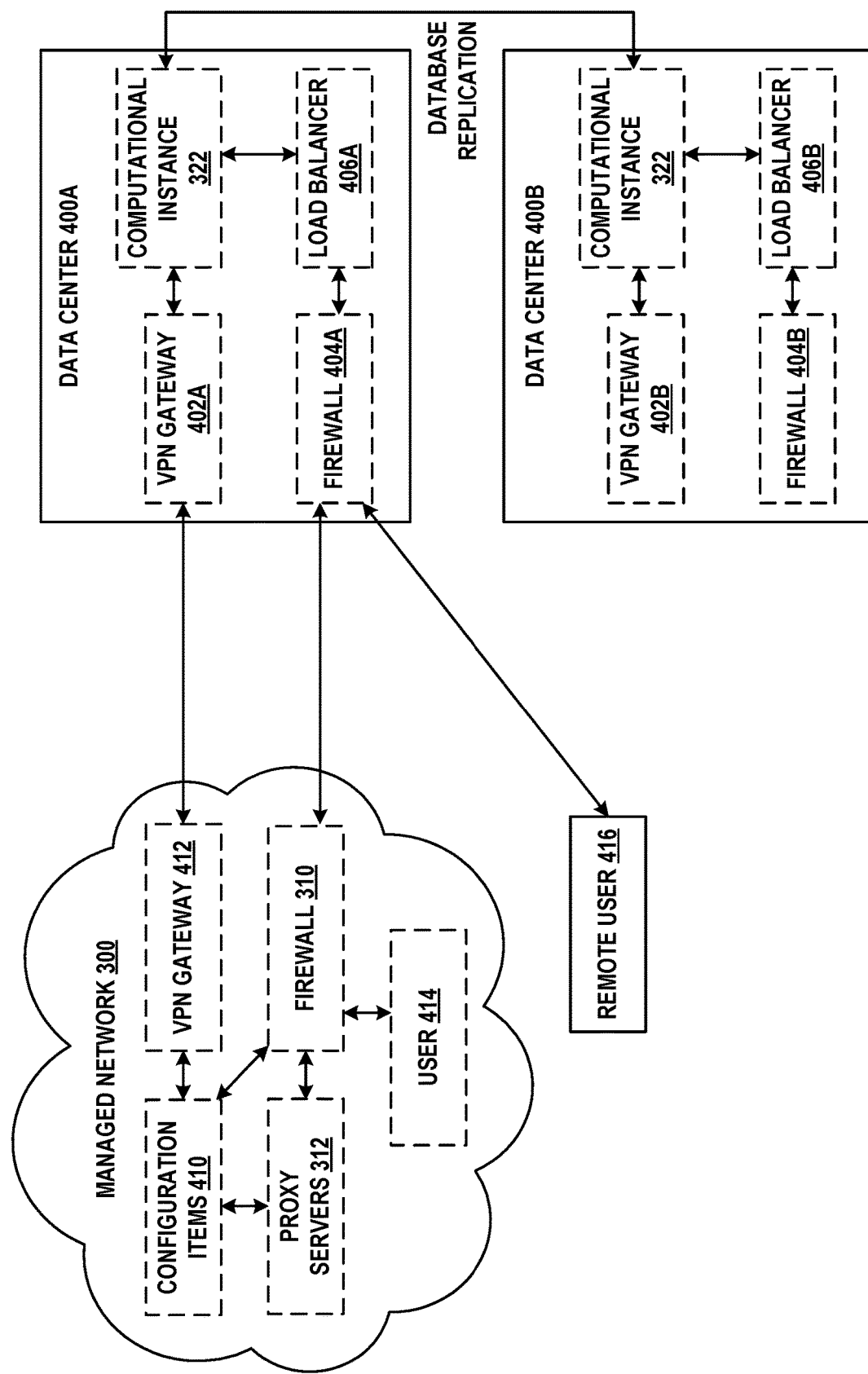
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
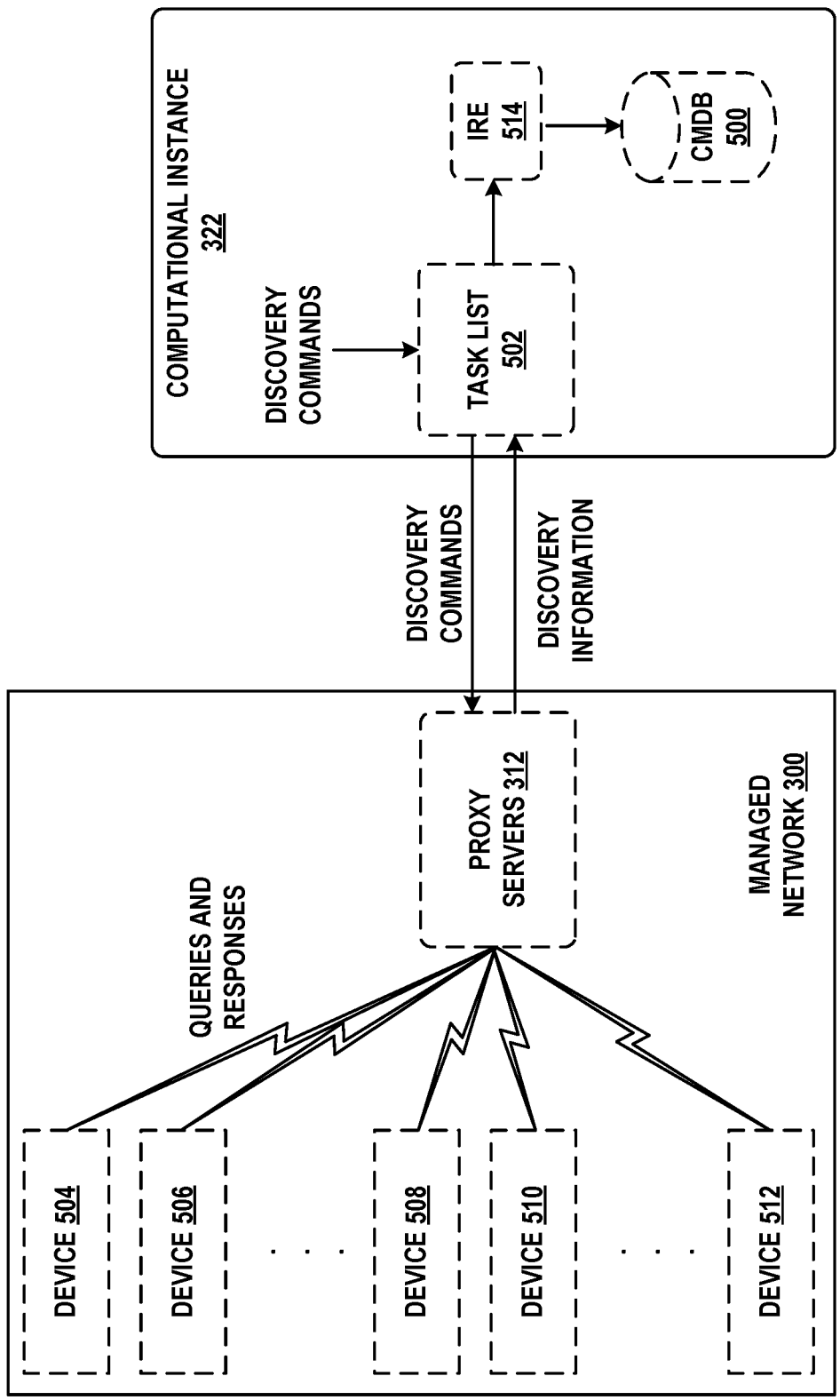
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es)

assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Example Security Controller

Figure 6:
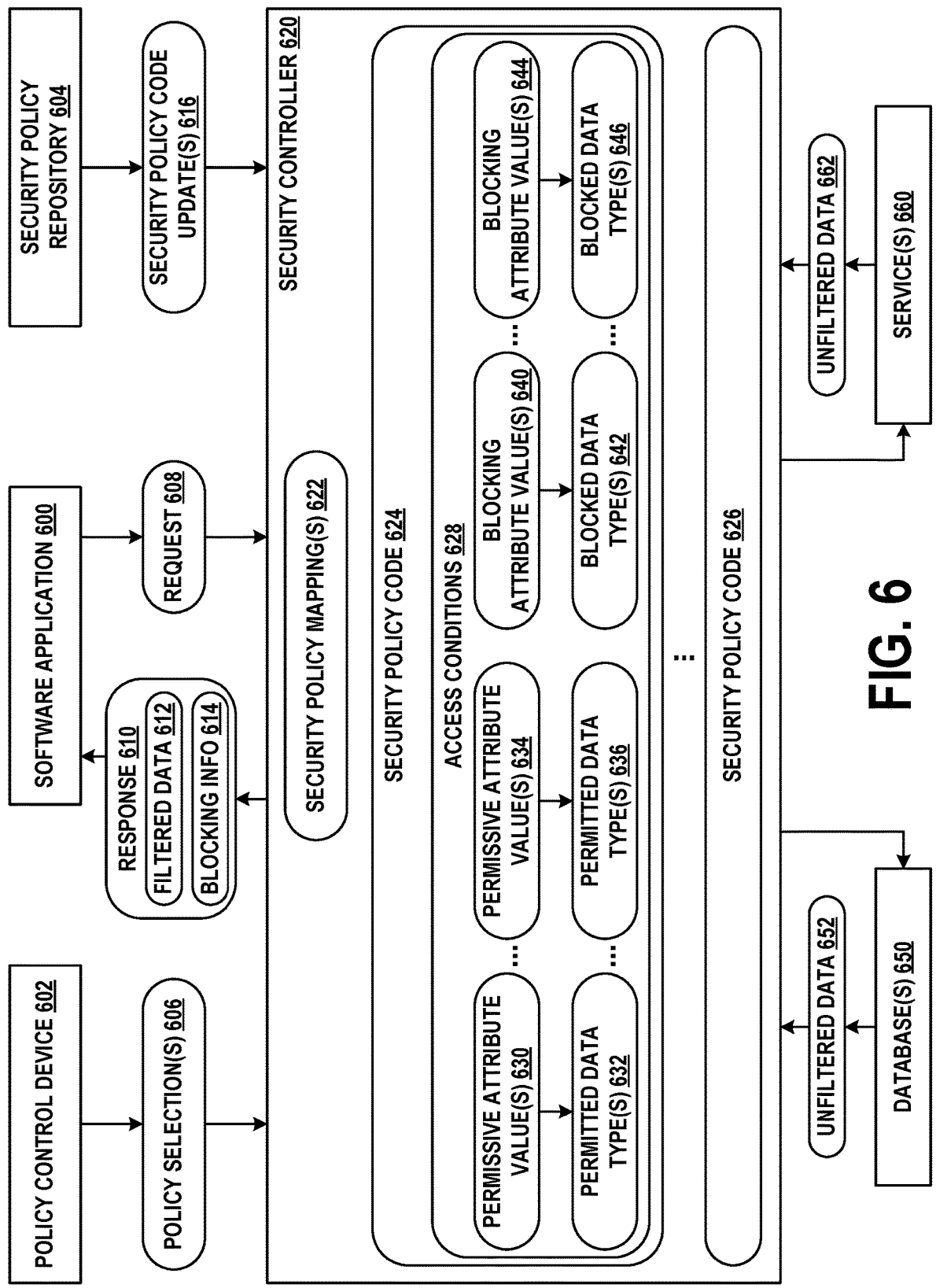
FIG. 6 depicts aspects of a computing system that includes a security controller, in accordance with example embodiments.

FIG. 6 illustrates a computing system that uses security controller 620 to control access to data protected by one or more security policies. The computing system may include security controller 620, software application 600, policy control device 602, security policy repository 604, and/or a source of the data, such as database(s) 650 and/or service(s) 660. Software application 600 may include any one or more instructions that access the source of the data, and may include user applications, system applications, operating systems, APIs, and/or components thereof, among other possibilities.

Software application 600 may be configured to access database(s) 650 and/or service(s) 660 by way of security controller 620, which may be configured to enforce one or more security policies on behalf of software application 600. That is, security controller 620 may operate as an intermediary between software application 600 and database(s) 650 and/or service(s) 660 that prevents software application 600 from violating the one or more security policies that are in effect therefor. Thus, software application 600 may operate in compliance with the one or more security policies without having to independently implement any aspects of these security policies.

Security policy repository 604 may be configured to store a plurality of sets of security policy code that implements a corresponding plurality of security policies. Specifically, a security policy may be implemented by corresponding security policy code that indicates conditions under which a particular data type and/or data instantiation may and/or may not be accessed. The plurality of security policies may be based on industry best practices, developer preferences, user preferences, various standards, and/or engineering/design specifications, among other factors.

Security policy repository 604 may be configured to provide, to security controller 620, security policy code update(s) 616. Security policy code update(s) 616 may represent new security policies for which corresponding security policy code is available and/or updates to the security policy code of existing security policies. In some cases, security policy code update(s) 616 may be pushed from security policy repository 604 to security controller 620 as security policy code update(s) 616 are released, thus allowing security controller 620 to execute the latest versions of the security policy code as soon as it is available. In other cases, security controller 620 may be configured to request security policy code update(s) 616 from security policy repository 604 based on and/or in response to one or more trigger events, including at predetermined times and/or upon reception of a user instruction, among other possibilities.

The security policy code provided by security policy repository 604 may be used by a plurality of instantiations of security controller 620. Thus, once a security policy is defined and implemented using corresponding security policy code stored in security policy repository 604, the security policy code may be reused by a plurality of entities using corresponding instantiations of security controller 620. For example, security policy repository 604 may be provided as part of remote network management platform 320, and each computational instance thereof may be configured to execute a corresponding instantiation of security controller 620. Thus, once a security policy is made available on and/or by remote network management platform 320, computational instances thereof may be able to utilize the security policy.

Policy control device 602 may be configured to select the security policies that security controller 620 is to implement on behalf of software application 600. For example, security controller 620 may be configured to provide, to policy control device 602 and as part of a user interface, a list of the software policies that security controller 620 is configured to implement and that are thus available to be enforced on behalf of different software applications. Policy control device 602 may be configured to display the list of software policies using the user interface, and allow one or more security policies to be selected for security controller 620 to implement on behalf of software application 600 and/or other software applications.

Policy control device 602 may represent a computing device and/or software application utilized by a user (e.g., an administrator) to control the security policies implemented by security controller 620 on behalf of one or more software applications, computational instances, and/or managed networks, among other possibilities. Policy control device 602 may be configured to provide policy selection(s) 606 to security controller 620. Policy selection(s) 606 may indicate (i) one or more security policies to be implemented by security controller 620 and (ii) a scope for the one or more security policies, such as an identification of one or more software applications on behalf of which the one or more security policies are to be implemented.

As one example, policy selection(s) 606 may indicate one or more security policies that security controller 620 is to implement on behalf of software application 600. As another example, policy selection(s) 606 may indicate one or more security policies that security controller 620 is to implement on behalf of a computational instance and/or managed network that hosts software application 600, thus applying the one or more security policies to multiple software applications hosted by the computational instance and/or managed network. Accordingly, software application 600 may be protected by security policies selected for software application 600 directly, and/or security policies selected for a computational instance and/or managed network in which software application 600 is hosted.

Security controller 620 may be configured to represent policy selection(s) 606 using security policy mapping(s) 622. Security policy mapping(s) 622 may indicate, for each software application, computational instance, managed network, and/or other grouping of computing resources, zero or more security policies to be implemented by security controller 620 on behalf thereof. Thus, when security controller 620 receives a data request from a particular software application, security controller 620 may be configured to use security policy mapping(s) 622 to determine the security policies to be implemented on behalf of the particular software application.

For example, software application 600 may be configured to provide, to security controller 620, request 608 that specifies at least some data to be obtained by software application 600. Request 608 may specify data requested by software application 600 from database(s) 650 and/or service(s) 660. Based on and/or in response to request 608, security controller 620 may be configured to determine and provide, to software application 600, response 610 that is compliant with any security policies that, as indicated by security policy mapping(s) 622, are to be implemented on behalf of software application 600 by security controller 620.

Security controller 620 may include security policy code 624 through security policy code 626 (i.e., security policy codes 624-626), each of which implements a corresponding security policy. Security policy codes 624-626 and/or portions thereof may be executable and/or interpretable, and/or may be expressed as source code, compiled instructions, and/or markup language, among other possibilities. Each respective security policy code of security policy codes 624-626 may include access conditions that define circumstances under which different types of data are accessible and/or inaccessible to different software applications. For example, access conditions 628 of security policy code 624 may include permissive attribute value(s) 630 through permissive attribute value(s) 634 (i.e., permissive attribute values 630-634) and blocking attribute value(s) 640 through blocking attribute value(s) 644 (i.e., blocking attribute values 640-644).

When permissive attribute value(s) 630 are associated with request 608, security controller 620 may be configured to allow software application 600 to access permitted data type(s) 632. When permissive attribute value(s) 634 are associated with request 608, security controller 620 may be configured to allow software application 600 to access permitted data type(s) 636. When blocking attribute value(s) 640 are associated with request 608, security controller 620 may be configured to block software application 600 from accessing blocked data type(s) 642. When blocking attribute value(s) 644 are associated with request 608, security controller 620 may be configured to block software application 600 from accessing blocked data type(s) 646.

In some implementations, permissive attribute values 630-634 may be omitted, and thus access to data may be permitted (e.g., by default) unless request 608 is associated with any of blocking attribute values 640-644. In other implementations, blocking attribute values 640-644 may be omitted, and thus access to data may be blocked (e.g., by default) unless request 608 is associated with any of permissive attribute values 630-644. Each of permissive attribute values 630-634 and blocking attribute values 640-644 may include a combination of one or more values of one or more corresponding attributes. Permissive attribute values 630-634 and blocking attribute values 640-644 may be mutually exclusive, such that access to a given data type and/or data instantiation is either permitted or blocked but not both permitted and blocked.

Permissive attribute values 630-634 and/or blocking attribute values 640-644 may represent values of one or more attributes. The one or more attributes may include an application property associated with software application 600 (e.g., application name, application type/class, application version, application developer/publisher, etc.), a device property associated with a computing device utilizing software application 600 (e.g., device location, device operating system, security software installed on the device, encryption used by the device, etc.), a user property associated with a user of software application 600 and/or the computing device (e.g., a name or other identifier of the user, permissions granted to the user, a role of the user, etc.), and/or a data property associated with the data specified by request 608 (e.g., data type, permissions associated with the data, cryptographic protections applied to the data, etc.), among other possibilities. Thus, the one or more attributes may represent properties of conditions/contexts under which a data access is requested, and thus be indicative of whether, under a given security policy, the data access is to be granted or blocked.

To provide software application 600 with response 610 that is compliant with any security policies selected for software application 600, security controller 620 may be configured to select, using security policy mapping(s) 622, one or more security policies to be enforced on behalf of software application 600. For example, security controller 620 may be configured to identify, based on request 608, software application 600 and/or its properties (e.g., a computational instance by which software application 600 is hosted) and, based on this identification, determine the one or more security policies selected by policy control device 602 for software application 600. Based on determination of the one or more security policies, security controller 620 may select, from security policy codes 624-626, the security policy code(s) that implement the determined one or more security policies.

For example, security controller 620 may determine that security policy code 624 implements the security policy selected for software application 600. Thus, security controller 620 may execute security policy code 624 to enforce the corresponding security policy on behalf of software application 600. Specifically, security controller 620 may identify one or more attributes based on which security policy code 624 conditions access to data, and determine value(s) of these one or more attributes. Based on the value(s) of the one or more attributes, security controller 620 may determine whether the value(s) correspond to permissive attribute values 630-634 and/or to blocking attribute values 640-644, thus determining the scope of data access that can be provided to software application 600 based on request 608.

Security controller 620 may also request, from database (s) 650 and/or service(s) 660 and on behalf of software application 600, data corresponding to request 608. Whether data is requested from database(s) 650 and/or service(s) 660 may depend on the type of data specified by request 608. Based on and/or in response to the data request from security controller 620, database(s) 650 may be configured to provide unfiltered data 652 and/or service(s) 660 may be configured to provide unfiltered data 662. Unfiltered data 652 and/or unfiltered data 662 may include all data that is responsive to request 608, and thus might not, at least in some cases, be compliant with the security policies in effect for software application 600.

Accordingly, security controller 620 may be configured to execute security policy code 624 to process unfiltered data 652 and/or 662 in accordance with access conditions 628, thereby generating response 610. Specifically, based on access conditions 628 and the value(s) of the one or more attributes, security controller 620 may select at least a subset of unfiltered data 652 and/or 662 that is compliant with the security policy (i.e., filtered data 612) and thus can be provided to software application 600. For example, security controller 620 may determine that the value(s) of the one or more attributes correspond to permissive attribute value(s) 634 and blocking attribute value(s) 640. Thus, security controller 620 may allow permitted data type(s) 636 found in unfiltered data 652 and/or 662 to be provided to software application 600, while blocking blocked data type(s) 642 found in unfiltered data 652 and/or 662 from being provided to software application 600.

Alternatively or additionally, in some implementations, security controller 620 may be configured to omit requesting from database(s) 650 and/or service(s) 660 at least some data that is not compliant with the security policies that are in effect for software application 600. For example, security controller 620 may be configured to modify a query present in request 608 by (i) retaining requests for data that, based on the value(s) of the one or more attributes, software application 600 is permitted to obtain and (ii) removing requests for data that, based on the value(s) of the one or more attributes, software application 600 is not permitted to obtain. Security controller 620 may then provide the modified query, rather than the original query present in request 608, to database(s) 650 and/or service(s) 660, and may thus instead obtain data that is partially and/or completely compliant with the security policies that are in effect for software application 600. Accordingly, security controller 620 may generate filtered data 612 by filtering the data itself and/or by filtering the query for the data.

Security controller 620 may be configured to provide response 610 to software application 600. Response 610 may include filtered data 612 and blocking info 614. Filtered data 612 may include a subset (e.g., some or all) of unfiltered data 652 and/or 662. For example, when only some of unfiltered data 652 and/or 662 is compliant with the security policy implemented by security policy code 624, filtered data 612 may represent a proper subset of unfiltered data 652 and/or 662. When all of unfiltered data 652 and/or 662 is compliant with the security policy implemented by security policy code 624, filtered data 612 may be equal to unfiltered data 652 and/or 662. When none of unfiltered data 652 and/or 662 is compliant with the security policy implemented by security policy code 624, filtered data 612 may be empty.

Blocking info 614 may include an indication that software application 600 is blocked from accessing at least some of the data corresponding to request 608. For example, blocking info 614 may include a representation of the security policy (e.g., an identifier of the security policy, such as a name thereof) and/or the attribute values that caused blocking of the data. Software application 600 may be configured to provide blocking info 614 to a user, thereby informing the user that some data has been blocked and/or providing a cause for blocking of this data. Accordingly, the user may be informed of the extent of filtering performed by security controller 620, and/or the manner in which a subsequent request could be modified (e.g., by using a different application and/or device, making the request from a different network and/or location, and/or having a different user make the request, etc.) to access the blocked data.

Software application 600 and/or policy control device 602 may be blocked and/or prevented from making source code modifications to any of security policy codes 624-626. Thus, security policy codes 624-626 may be modifiable by developers associated with security policy repository 604, but not developers and/or users of software application 600 and/or policy control device 602. Thus, security policy codes 624-626 may be generated and/or maintained by developers that specialize in implementation of security policies, possibly without involvement of less specialized developers, thereby reducing the number of possible sources of programming errors.

Additionally, software application 600 may be permitted to access database(s) 650 and/or service(s) 660 by way of security controller 620, but might not be permitted to access database(s) 650 and/or service(s) 660 directly (i.e., by bypassing security controller 620). Thus, software application 600 may be unable to cause intentional and/or accidental violations of any security policies that are in effect therefor, and compliance with these security policies may thus be independent of operations performed by software application 600. That is, response 610 generated by security controller 620 will be compliant with any security policies in effect for software application 600 even when request 608 attempts to obtain data in violation of these security policies. Further, since compliance with security policies is handled by security controller 620, development of software application 600 need not involve independent implementation of any security policies available by way of security controller 620, thereby reducing software development efforts for software application 600.

VII. Example Message Flow Diagrams

Figure 7A:
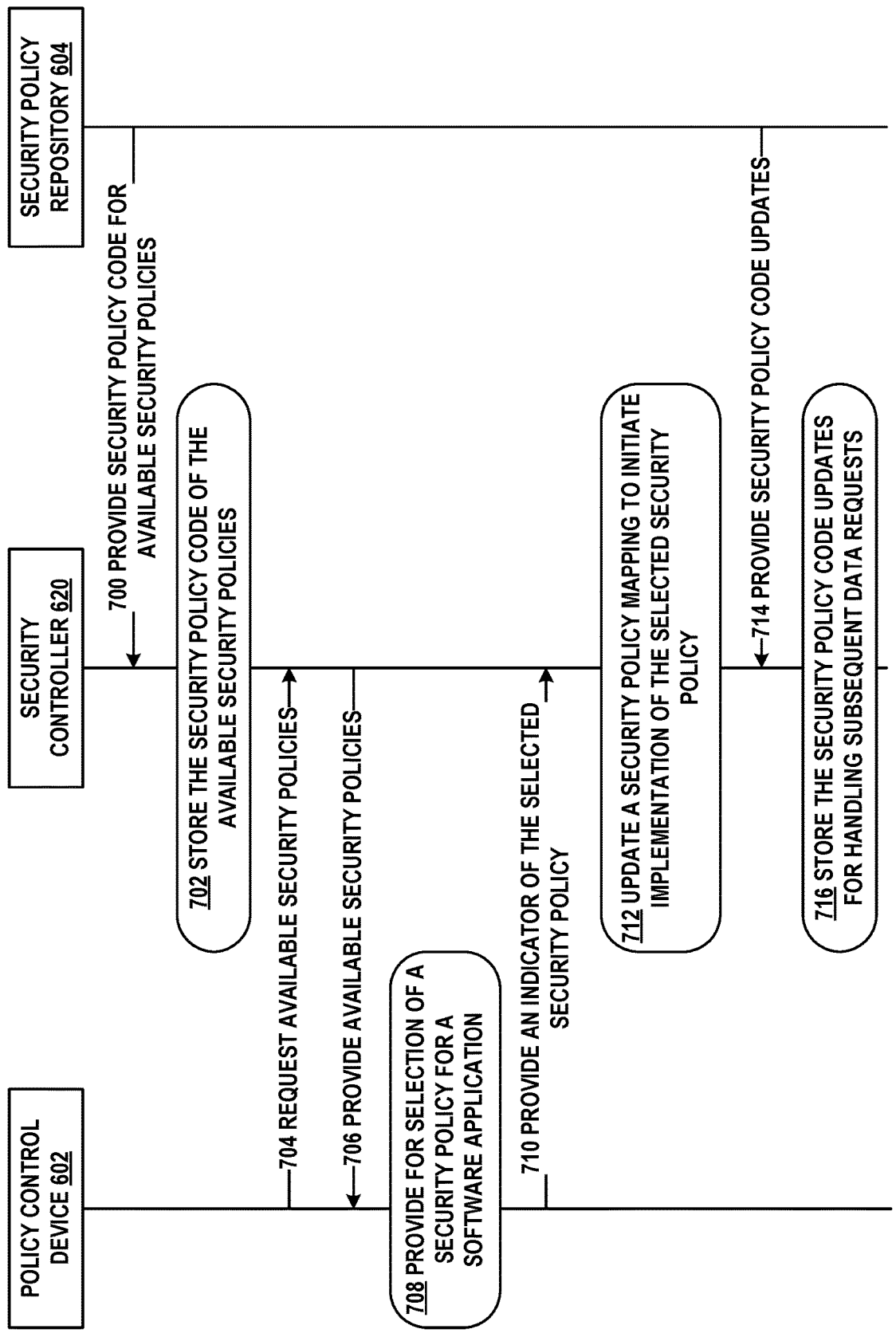
FIG. 7A is a message flow diagram, in accordance with example embodiments.
Figure 7B:
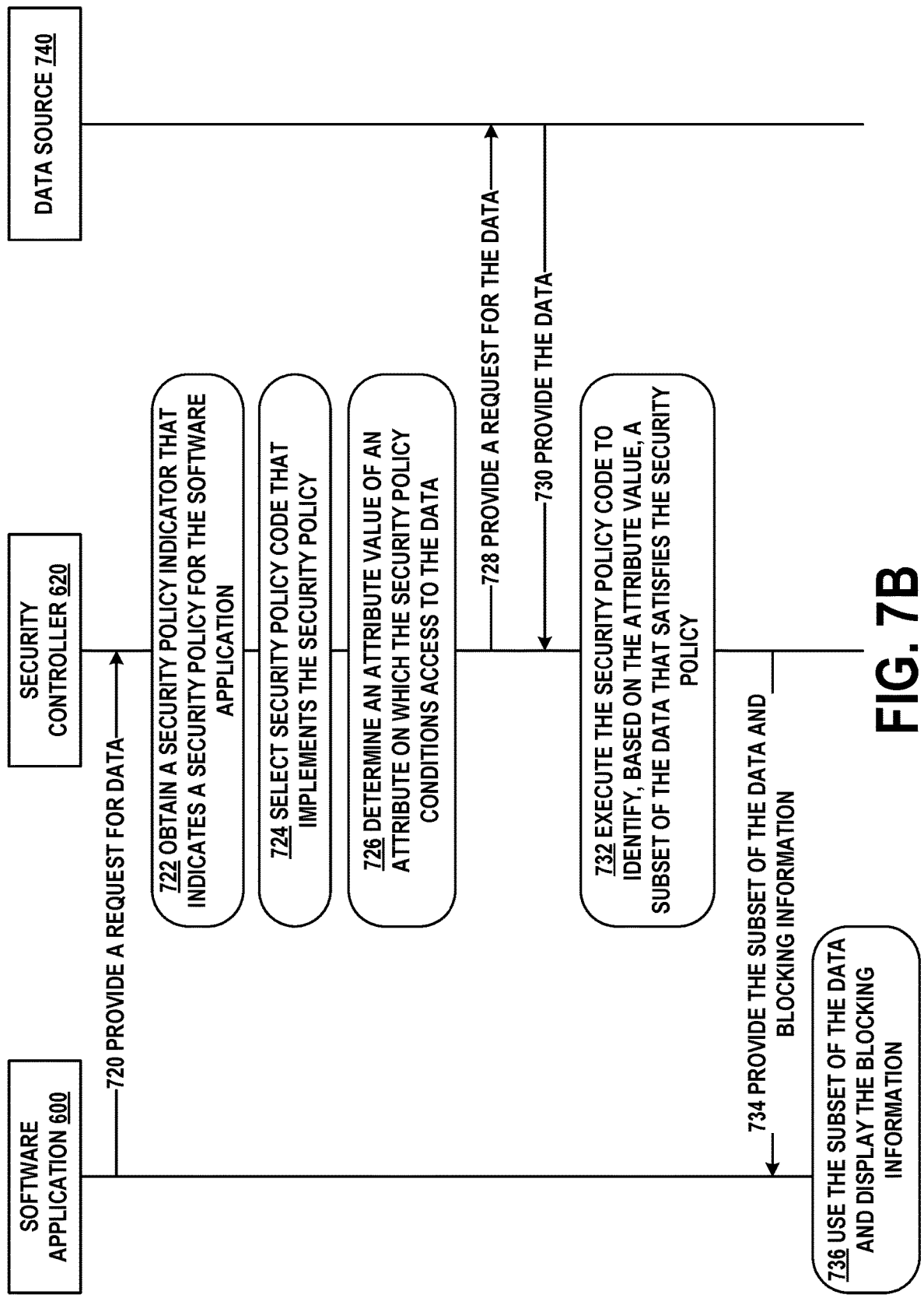
FIG. 7B is a message flow diagram, in accordance with example embodiments.

FIGS. 7A and 7B illustrate example operations involved in deploying and implementing security policy code using security controller 620. Turning to FIG. 7A, security policy repository 604 may be configured to provide, to security controller 620, security policy code for available security policies, as indicated by arrow 700. In some implementations, the security policy code of arrow 700 may be pushed from security policy repository 604 to security controller 620 (e.g., using an event bus), thus providing security controller 620 with the latest security policy code as it becomes available. In other implementations, the security policy code of arrow 700 may be provided in response to a request from security controller 620.

Based on and/or in response to reception of the security policy code at arrow 700, security controller 620 may be configured to store the security policy code of the available security policies, as indicated by block 702. Once the security policy code implementing a given security policy is stored on security controller 620, the given security policy may be available for deployment by security controller 620 on behalf of software applications.

Policy control device 602 may be configured to request available security policies that security controller 620 is configured to implement, as indicated by arrow 704. Based on and/or in response to reception of the request at arrow 704, security controller 620 may be configured to provide the available security policies, as indicated by arrow 706. The available security policies may include any security policies for which security policy code has been obtained from security policy repository 604, including at arrow 700.

Based on and/or in response to reception of the available security policies at arrow 706, policy control device 602 may be configured to provide for selection of a security policy to be implemented by security controller 620 on behalf of a software application (e.g., software application 600), as indicated by block 708. For example, policy control device 602 may display the available security policies, and allow for selection of (i) one or more of the available security policies and (ii) the software application for which the selected security policies are to be implemented. Policy control device 602 may be configured to specify that a given security policy is to be applied to a particular software application, a particular computational instance (and thus multiple and/or all software applications provided thereby), and/or a particular managed network (and thus multiple and/or all computational instances and/or software applications associated therewith).

Based on and/or in response to selection of the security policy at block 708, policy control device 602 may be configured to provide an indicator of the selected security policy to security controller 620, as indicated by arrow 710. The indicator of the selected security policy may specify a scope (e.g., application, computational instance, network, etc.) at which the selected security policy is to be applied. Based on and/or in response to reception of the indicator of the selected security policy at arrow 710, security controller 620 may be configured to update a security policy mapping (e.g., security policy mapping(s) 622) to initiate implementation/enforcement of the selected security policy, as indicated by block 712. Once the security policy mapping is updated, any requests for data received from the software application by security controller 620 may be handled in accordance with the security policy selected at block 708.

Security policy repository 604 may be configured to provide, to security controller 620, security policy code updates, as indicated by arrow 714. For example, the security policy code updates may be pushed by security policy repository 604 and/or provided in response to requests from security controller 620. Based on and/or in response to reception of the security policy code updates at arrow 714, security controller 620 may be configured to store the security policy code updates for handling subsequent data requests, as indicated by block 716. By updating the security policy code stored by security controller 620, security policy repository 604 may modify the implementations of the security policies utilized by a plurality of different software applications without making any modifications to these software applications.

Turning to FIG. 7B, software application 600 may be configured to provide, to security controller 620, a request for data (e.g., request 608), as indicated by arrow 720. In cases where no security policies are enabled for software application 600, security controller 620 may be configured to provide, to software application 600, the requested data without execution of any software policy code and/or performing any data filtering.

In cases where at least one security policy (e.g., as specified at block 708) is enabled for software application 600, security controller 620 may be configured to obtain, based on and/or in response to reception of the request for data at arrow 720, a security policy indicator that indicates a security policy for software application 600, as indicated by block 722. For example, security controller 620 may be configured to identify software application 600, a user associated with software application 600, a group or class to which such a user belongs, a computational instance by which software application 600 is hosted, and/or a network with which software application 600 is hosted and, based thereon, obtain the security policy indicator from the security policy mapping. By obtaining the security policy indicator, security controller 620 may determine any security policies that policy control device 602 requested to be enforced by security controller 620 on behalf of software application 600.

Based on and/or in response to obtaining the security policy indicator at block 722, security controller 620 may be configured to select security policy code that implements the security policy indicated by the security policy indicator, as indicated by block 724. Selecting, obtaining, and executing the security policy code may allow security controller 620 to implement/enforce the security policy on behalf of software application 600.

Based on and/or in response to selecting of the security policy code at block 724, security controller 620 may be configured to determine an attribute value of an attribute on which the security policy conditions access to the data, as indicated by block 726. Determining the attribute value may include parsing and/or executing at least part of the security policy code to identify the attribute on which data access is conditioned. Determining the attribute value may also include parsing the request at arrow 720 (e.g., the contents thereof, including metadata associated therewith), and/or making additional requests for data representing the attribute value to, for example, software application 600 and/or database(s) that store information about software application 600, among other possibilities. In some cases, determining the attribute value may include determining a plurality of attribute values of a plurality of attributes on which the security policy conditions access to the data.

Based on and/or in response to determining the attribute value at block 726, security controller 620 may be configured to provide a request for the data to data source 740, as indicated by arrow 728. Data source 740 may include and/or represent database(s) 650 and/or service(s) 660, as illustrated in FIG. 6. Based on and/or in response to reception of the request at arrow 728, data source 740 may be configured to provide the data, as indicated by arrow 730. The data provided at arrow 730 may be unfiltered (e.g., representing unfiltered data 652 and/or 662), and thus might not be compliant with the security policy in effect for software application 600.

Accordingly, based on and/or in response to reception of the data at arrow 730, security controller 620 may be configured to execute the security policy code to identify, based on the attribute value, a subset of the data that satisfies the security policy, as indicated by block 732. For example, for each respective type of data provided at arrow 730, security controller 620 may be configured to determine whether, given the attribute value, the security policy permits or blocks sharing of the respective data type with software application 600. That is, security controller 620 may be configured to determine (i) whether the attribute value corresponds to one of permissive attribute value(s) 630-634, and thus the respective data type is one of permitted data type(s) 632-636, and/or whether the attribute value corresponds to (ii) one of blocking attribute value(s) 640-644, and thus the respective data type is one of blocked data type(s) 642-646.

In some implementations, at least part of the security policy code of block 732 may be executed prior to transmission of the request of arrow 728. Specifically, security controller 620 may be configured to modify a data query of the request of arrow 720 to omit requesting, at arrow 728, at least some data that is not compliant with the security policy in effect for software application 600. For example, security controller 620 may be configured to omit requesting, from data source 740, instantiations of data types that are blocked based on the attribute value determine at block 726. Thus, security controller 620 may identify the subset of the data that satisfies the security policy by modifying the query submitted to data source 740 and/or by filtering the data received at arrow 730.

Based on and/or in response to identifying the subset of the data at block 732, security controller 620 may be configured to provide the subset of the data (e.g., filtered data 612), along with any blocking information (e.g., blocking info 614), to software application 600, as indicated by arrow 734. Based on and/or in response to reception of the subset of the data and any blocking information at arrow 734, software application 600 may be configured to use the subset of the data and display the blocking information, as indicated by block 736. Displaying the blocking information may allow a user of software application 600 to determine which data has been blocked, why this data has been blocked, and/or how to modify subsequent requests to access this data in compliance with the security policy.

VIII. Example Technical Improvements

These embodiments provide a technical solution to a technical problem. One technical problem being solved is how to configure multiple different software applications to consistently operate in accordance with one or more security policies. In practice, this is problematic because developing and/or maintaining multiple application-specific implementations of the one or more security policies consumes significant developer resources and/or creates opportunities for software errors, especially as the number of software applications increases.

In the prior art, a security policy might be implemented as part of the software application, resulting in multiple different application-specific implementations of the same security policy across different software applications. However, these techniques do not allow an implementation of the security policy to be reused and/or scaled across multiple different software applications. Moreover, the prior art depends on different software developers with varying skill levels and/or varying security expertise to create and maintain the different application-specific implementations of the security policy, which leads to wildly varying outcomes from instance to instance. Thus, prior art techniques did little if anything to address the need for consistency, scalability, reusability, and security in implementations of security policies across a large number of software applications.

The embodiments herein overcome these limitations by providing a security controller that implements various security policies on behalf of different software applications. In this manner, development and maintenance of security policy implementations can be accomplished in a more accurate and robust fashion. This results in several advantages. First, the security controller can be used by multiple different software applications without necessitating different application-specific implementations of security policies. Second, security policy code deployed on the security controller may be developed and maintained by developers that specialize in and/or have substantial experience in developing security policies, thus reducing the likelihood of software errors. Third, implementation of the security policies by the security controller may be independent of the operations performed by the different software applications, thus preventing intentional and/or accidental violations of the security policies by the different software applications. Fourth, users may be able to select the security policies to be enforced on behalf of a particular software application, thus allowing for application-specific selections of the scope of data protection.

Other technical improvements may also flow from these embodiments, and other technical problems may be solved. Thus, this statement of technical improvements is not limiting and instead constitutes examples of advantages that can be realized from the embodiments.

IX. Example Operations

Figure 8:
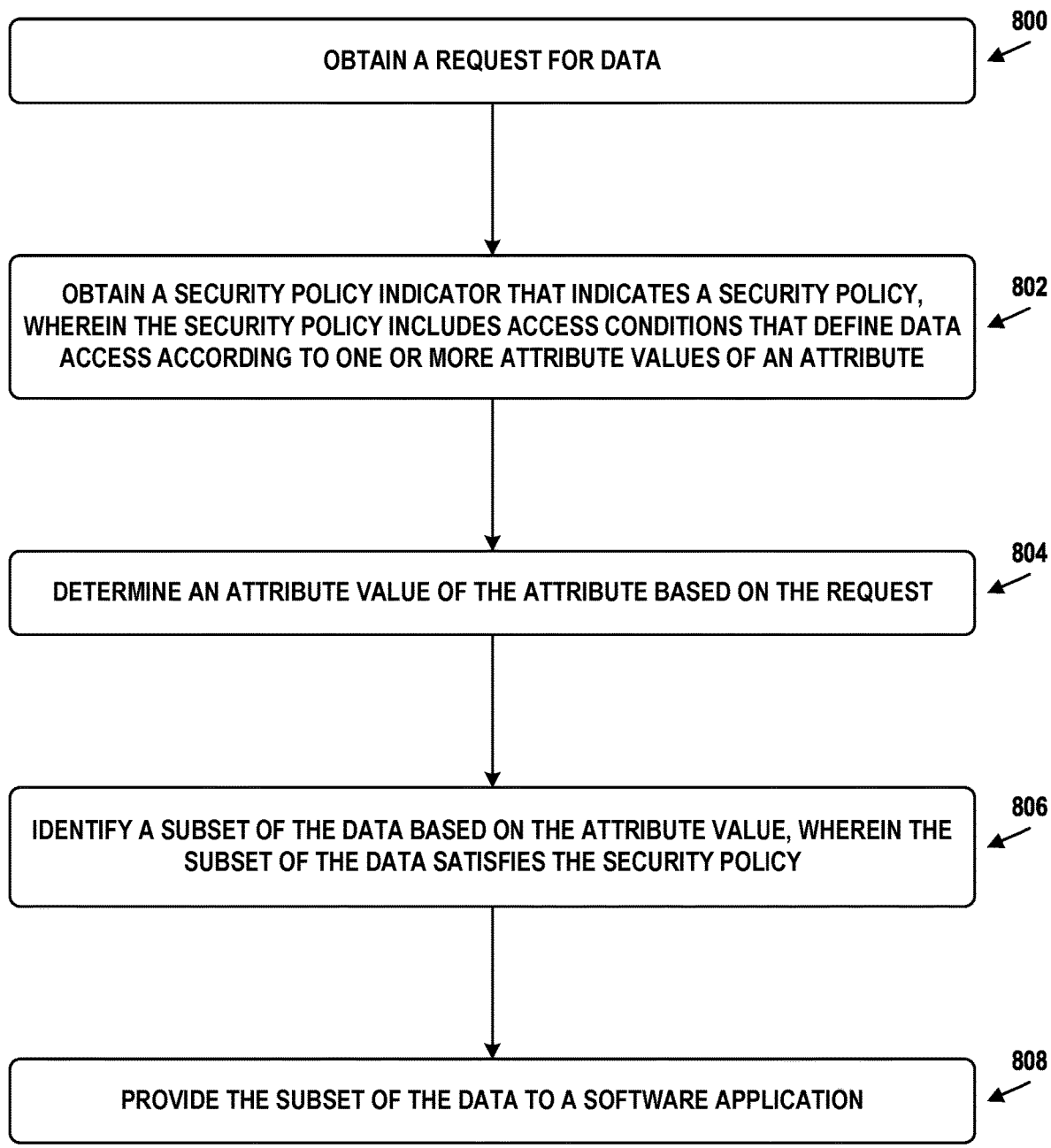
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining a request for data.

Block 802 may involve obtaining a security policy indicator that indicates a security policy. The security policy may include access conditions that define data access according to one or more attribute values of an attribute.

Block 804 may involve determining an attribute value of the attribute based on the request.

Block 806 may involve identifying a subset of the data based on the attribute value. The subset of the data may satisfy the security policy.

Block 808 may involve providing the subset of the data to a software application.

In some examples, a security policy code corresponding to the security policy may be configured to implement the security policy on behalf of the software application. The security policy code may include the access conditions. Identifying the subset of the data based on the attribute value may include executing the security policy code on behalf of the software application to obtain, based on the request and the attribute value, the subset of the data.

In some examples, the security policy code may be inaccessible to and unmodifiable by the software application such that implementation of the security policy on behalf of the software application is independent of operations performed by the software application.

In some examples, obtaining the security policy indicator may include obtaining a representation of a selection of the security policy for the software application, and selecting, based on the security policy, security policy code configured to implement the security policy on behalf of the software application.

In some examples, the security policy may indicate, for a data type of the data: (i) one or more permissive attribute values of the attribute that, when determined based on the request, allow the software application to access instantiations of data having the data type, and (ii) one or more blocking attribute values of the attribute that, when determined based on the request, block the software application from accessing the instantiations of data having the data type. The attribute value may include one of the one or more permissive attribute values.

In some examples, the security policy may be implemented by a security controller configured to mediate communications between the software application and a source of the data.

In some examples, the software application may be executed by a remote network management platform, and the security policy may be implemented by a security controller provided by the remote network management platform.

In some examples, providing the subset of the data may include providing, to the software application, (i) a first portion of the data that the software application is permitted to access under the security policy and (ii) an indication that the software application is blocked from accessing a second portion of the data under the security policy.

In some examples, the indication that the software application is blocked from accessing the second portion of the data may include a representation of (i) the security policy and (ii) the attribute value that causes the security policy to block the software application from accessing the second portion of the data.

In some examples, the data may be protected by the security policy. Obtaining the request for data may include obtaining the request for data from the software application.

In some examples, obtaining the security policy indicator includes obtaining the security policy indicator for a computational instance of a remote network management platform. The security policy indicator may indicate that software applications provided by the computational instance are to adhere to the security policy. The software application may be provided by the computational instance.

In some examples, obtaining the security policy indicator may include providing a user interface configured to display a plurality of security policies that is available, and receiving, by way of the user interface, a selection of the security policy from the plurality of security policies.

In some examples, a security policy update may be obtained that is configured to implement an updated version of the security policy on behalf of the software application. Subsequent requests for the data protected by the security policy may be satisfied based on the security policy update.

In some examples, the data may include one or more of: (i) one or more contents of a database or (ii) one or more services that the software application is configured to access.

In some examples, the security policy may be configured to provide compliance with a standard and/or regulation (e.g., a legal regulation).

In some examples, the attribute may include one or more of: (i) an application property associated with the software application, (ii) a device property associated with a computing device utilizing the software application, (iii) a user property associated with a user of the computing device, or (iv) a data property associated with the data.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   obtaining a request for data;
   obtaining a security policy indicator that indicates a security policy, wherein the security policy includes access conditions that define data access according to one or more attribute values of an attribute, wherein a security policy code corresponding to the security policy is configured to implement the security policy on behalf of a software application, wherein the security policy code includes the access conditions and is executable by a security controller provided by a remote network management platform, wherein the security controller is configured to mediate communications between the software application and a source of the data, and wherein the security policy indicates, for a data type of the data, at least one of:
- (i) one or more permissive attribute values of the attribute that, when determined based on the request, allow the software application to access instantiations of data having the data type, or
- (ii) one or more blocking attribute values of the attribute that, when determined based on the request, block the software application from accessing the instantiations of data having the data type;

determining an attribute value of the attribute based on the request, wherein the attribute value includes at least one of: a permissive attribute value of the one or more permissive attribute values or a blocking attribute value of the one or more blocking attribute values;

executing the security policy code by the security controller on behalf of the software application to obtain, based on the request and the attribute value, a filtered subset of the data by filtering the data according to the access conditions, wherein the filtered subset of the data satisfies the security policy; and providing the filtered subset of the data to the software application.

2. The method of claim 1, wherein the security policy code is inaccessible to and unmodifiable by the software application such that implementation of the security policy on behalf of the software application is independent of operations performed by the software application.

3. The method of claim 1, wherein obtaining the security policy indicator comprises:
obtaining a representation of a selection of the security policy for the software application; and
selecting, based on the security policy, the security policy code configured to implement the security policy on behalf of the software application.

4. The method of claim 1, wherein the software application is executed by the remote network management platform.

5. The method of claim 1, wherein providing the filtered subset of the data comprises:
providing, to the software application, (i) a first portion of the data that the software application is permitted to access under the security policy and (ii) an indication that the software application is blocked from accessing a second portion of the data under the security policy.

6. The method of claim 5, wherein the indication that the software application is blocked from accessing the second portion of the data comprises a representation of (i) the security policy and (ii) the attribute value that causes the security policy to block the software application from accessing the second portion of the data.

7. The method of claim 1, wherein the data is protected by the security policy, and wherein obtaining the request for data comprises:
obtaining the request for data from the software application.

8. The method of claim 1, wherein obtaining the security policy indicator comprises:
obtaining the security policy indicator for a computational instance of the remote network management platform, wherein the security policy indicator indicates that software applications executed by the computational instance are to adhere to the security policy, and wherein the software application is executed by the computational instance.

9. The method of claim 1, wherein obtaining the security policy indicator comprises:
providing a user interface configured to display a plurality of security policies that is available; and
receiving, by way of the user interface, a selection of the security policy from the plurality of security policies.

10. The method of claim 1, further comprising:
obtaining a security policy update configured to implement an updated version of the security policy on behalf of the software application, wherein subsequent requests for the data protected by the security policy are satisfied based on the security policy update.

11. The method of claim 1, wherein the data comprises one or more of: (i) one or more contents of a database or (ii) one or more services that the software application is configured to access.

12. The method of claim 1, wherein the security policy is configured to provide compliance with a standard or regulation.

13. The method of claim 1, wherein the attribute comprises one or more of: (i) an application property associated with the software application, (ii) a device property associated with a computing device utilizing the software application, (iii) a user property associated with a user of the computing device, or (iv) a data property associated with the data.

14. A non-transitory computer-readable medium, having stored thereon program instructions that, upon execution by a computing system, cause the computing system to perform operations comprising:
obtaining a request for data;
obtaining a security policy indicator that indicates a security policy, wherein the security policy includes access conditions that define data access according to one or more attribute values of an attribute, wherein a security policy code corresponding to the security policy is configured to implement the security policy on behalf of a software application, wherein the security policy code includes the access conditions and is executable by a security controller provided by a remote network management platform, wherein the security controller is configured to mediate communications between the software application and a source of the data, and wherein the security policy indicates, for a data type of the data, at least one of:
- (i) one or more permissive attribute values of the attribute that, when determined based on the request, allow the software application to access instantiations of data having the data type, or
- (ii) one or more blocking attribute values of the attribute that, when determined based on the request, block the software application from accessing the instantiations of data having the data type;

determining an attribute value of the attribute based on the request, wherein the attribute value includes at least one of: a permissive attribute value of the one or more permissive attribute values or a blocking attribute value of the one or more blocking attribute values;

executing the security policy code by the security controller on behalf of the software application to obtain, based on the request and the attribute value, a filtered subset of the data by filtering the data according to the access conditions, wherein the filtered subset of the data satisfies the security policy; and providing the filtered subset of the data to the software application.

15. The non-transitory computer-readable medium of claim 14, wherein the security policy code is inaccessible to and unmodifiable by the software application such that implementation of the security policy on behalf of the software application is independent of operations performed by the software application.

16. A system comprising:
one or more processors; and
memory, containing program instructions that, upon execution by the one or more processors, cause the system to perform operations comprising:
  obtaining a request for data;
  obtaining a security policy indicator that indicates a security policy, wherein the security policy includes access conditions that define data access according to one or more attribute values of an attribute, wherein a security policy code corresponding to the security policy is configured to implement the security policy on behalf of a software application, wherein the security policy code includes the access conditions and is executable by a security controller provided by a remote network management platform, wherein the security controller is configured to mediate communications between the software application and a source of the data, and wherein the security policy indicates, for a data type of the data, at least one of:
    (i) one or more permissive attribute values of the attribute that, when determined based on the request, allow the software application to access instantiations of data having the data type, or
    (ii) one or more blocking attribute values of the attribute that, when determined based on the request, block the software application from accessing the instantiations of data having the data type;
  determining an attribute value of the attribute based on the request, wherein the attribute value includes at least one of: a permissive attribute value of the one or more permissive attribute values or a blocking attribute value of the one or more blocking attribute values;
  executing the security policy code by the security controller on behalf of the software application to obtain, based on the request and the attribute value, a filtered subset of the data by filtering the data according to the access conditions, wherein the filtered subset of the data satisfies the security policy; and
  providing the filtered subset of the data to the software application.

17. The system of claim 16, wherein the security policy code is inaccessible to and unmodifiable by the software application such that implementation of the security policy on behalf of the software application is independent of operations performed by the software application.

18. The system of claim 16, wherein obtaining the security policy indicator comprises:
  obtaining the security policy indicator for a computational instance of the remote network management platform, wherein the security policy indicator indicates that software applications executed by the computational instance are to adhere to the security policy, and wherein the software application is executed by the computational instance.

19. The system of claim 16, wherein providing the filtered subset of the data comprises:
  providing, to the software application, (i) a first portion of the data that the software application is permitted to access under the security policy and (ii) an indication that the software application is blocked from accessing a second portion of the data under the security policy.

20. The non-transitory computer-readable medium of claim 14, wherein obtaining the security policy indicator comprises:
  obtaining the security policy indicator for a computational instance of the remote network management platform, wherein the security policy indicator indicates that software applications executed by the computational instance are to adhere to the security policy, and wherein the software application is executed by the computational instance.

\* \* \* \* \*